United States Patent

[11] 3,604,326

[72] Inventors Edward W. James, II
  Oxford, Pa.;
  Eustathios Vassiliou, Wilmington, Del.
[21] Appl. No. 886,619
[22] Filed Dec. 19, 1969
[45] Patented Sept. 14, 1971
[73] Assignee E. I. du Pont de Nemours and Company
  Wilmington, Del.

[54] METHOD AND APPARATUS FOR MAGNETIC-OPTICAL PRINTING
  10 Claims, 12 Drawing Figs.
[52] U.S. Cl. .................................................. 95/4.5,
  355/17
[51] Int. Cl. ............................................. B41b 13/00,
  G03g 19/00
[50] Field of Search ........................................ 355/3, 17;
  95/4.5; 346/74

[56] References Cited
UNITED STATES PATENTS
2,954,006  9/1960  Lawrence ..................... 355/3 X
Primary Examiner—John M. Horan
Attorney—Harry J. McCauley ABSTRACT: A method and apparatus for magnetic-optical printing employing a light-transparent uniformly magnetized magnetic medium upon which characters to be printed are first imaged magnetically and then delineated by optical masking using ferromagnetic toner, after which the characters are photographically recorded.

METHOD AND APPARATUS FOR MAGNETIC-OPTICAL PRINTING

BRIEF SUMMARY OF THE INVENTION

Generally, this invention comprises a method and apparatus for magnetic-optical printing utilizing a photographic recording medium which is exposed to a light source, comprising, in sequence:
1. forming a magnetic pattern imaging the subject matter to be printed upon a light-transparent uniformly magnetized magnetic medium comprising a light-transparent support carrying distributed particulate magnetic material affixed to the side of the support to be employed as the recording surface by characteristic magnetization of the particulate magnetic material constituting the image of the subject matter to be printed to a condition of different receptivity for ferromagnetic toner as contrasted with the adjacent background of the magnetic medium,
2. decorating the recording surface of the magnetic medium with a ferromagnetic toner defining an adherent optical mask of the image,
3. interposing the magnetic medium carrying the adherent optical mask of the image between the photographic recording medium and the associated light source, and
4. actuating the light source to emit exposure radiation through the optical mask onto the photographic recording medium.

Magnetic-optical printing according to this invention involves sequentially forming an invisible magnetic image of the subject matter to be printed on a light-transparent magnetic medium, rendering the magnetic image visible by laying down an adherent optical mask which precisely delineates the subject matter to be printed, and thereafter photographically recording.

The magnetic medium employed in our method must thus be capable of forming clean-cut magnetic images of the subject matter to be printed, which can be of the size scale, typically, of pica typewriter characters or the like, and subsequently permit sharp photographic readout through the agency of optical masking faithfully delineating the magnetic images.

A wide variety of magnetic recording films or plates can be made up which are satisfactory for our purposes, the general requirements of which will become apparent from the detailed specifications of one type of magnetic film with which applicants have had extensive experience.

This particular magnetic film is the subject matter of application Ser. No. 834,121, filed June 17, 1969, of common assignment herewith, which can typically comprise a flexible ultraviolet radiation-transmitting polymeric tape, e.g., polycarbonate, polyvinyl chloride, cellulose acetate, or the like having a thickness of 0.1 to 10 mils. This tape is embossed on its recording surface to provide recesses into which light-opaque particulate magnetic material is loaded as a suspension in a settable binder, such as "Aroplaz" or the like as hereinafter described, which permits uniform magnetic orientation of the magnetic material particles without agglomeration prior to anchoring in place upon set up of the binder. The embossing pattern employed is such as to give a regular distribution of the particulate magnetic material employed, which thus displays very uniform magnetic behavior over the full film expanse and yet possesses an overall light transmission ranging from about 5 percent to about 95 percent, preferably at least 50 percent for the purposes of this invention. As hereinafter described, it is preferred to use ultraviolet radiation for the particular photographic recording employed as an example, and, thus, the film, in this instance, should transmit ultraviolet light. However, conventional photography using visible light is an equally feasible alternative, in which case a magnetic medium transparent to visible light is, of course, necessary.

The particulate magnetic material in this instance was relatively magnetically "hard," in that it consisted of very finely divided chromium dioxide ($CrO_2$) in either substantially pure state or modified with other reactive elements. The preferred particle size was about 1 micron maximum dimension or under, although some particles measuring about 10 microns can be used and, of course, there was a tendency for particles to agglomerate, so that agglomerations frequently attained 10 microns effective size. In the particle size employed, the magnetic material had both a relatively high coercivity and remanence, which was desirable for adherent optical mask formation as hereinafter described. Suitable chromium dioxide-containing compositions are detailed in U.S. PATS. Nos. 2,956,955, 3,117,093, 3,074,778, 3,078,147, 3,278,263, 2,923,683–4, 3,034,988, 3,068,176 and 2,923,685. The compositions described in these patents relate to magnetic materials having relatively low Curie temperatures; however, this property is not employed in the preferred practice of our invention, although the magnetic imaging step of our invention can be accomplished using this property if desired.

It is essential that there exist substantially uniform optical transparency and, at the same time, the maintenance of strong enough magnetic fields between spaced magnetic particles or their agglomerates to attract magnetic toner particles uniformly independent of the extent of the magnetized area. While these properties are to some degree mutually opposed, a compromise which is entirely satisfactory consists in spacing magnetic patterns (e.g. lines, dots, combinations of each, or other configurations) about one-fiftieth inch to one fifteen-hundredth inch apart (i.e., 50 to 1500 lines/in.) and preferably one-fiftieth inch to one five-hundredth inch apart (i.e., 50 to 500 lines/in.). The depth the magnetic stratum consisting of binder loaded with uniformly dispersed particulate magnetic solids was limited to from 0.05 to 2 mils, and preferably from 0.1 to 1 mil.

In a typical instance, acicular chromium dioxide particles having the magnetic properties $iH_c$=465 oersteds, $\sigma_s$=80.5 emu/g. $\sigma_r$=38.2 emu/g. were thoroughly dispersed by ink milling with an alkyd binder (e.g., Aroplaz 1271, a long oil linseed alkyd marketed by Archer-Daniels-Midland Co.) and Stoddard solvent. During the milling the paste produced was diluted, as necessary, by adding the Stoddard solvent, and was further diluted with the same solvent to give a paste of about 600 poises viscosity at time of use. At this point the ratio of $CrO_2$/alkyd/Stoddard solvent was 66/22/12 percent by weight. The weight ratio of $CrO_2$ to binder was 3:1.

The resulting paste was doctored into embossed line or groove recesses of a Lexan (polycarbonate resin marketed by the General Electric Co.) film support to give a smooth recording surface, after which the magnetic particles were given a common horizontal orientation coplanar with the support film surface and transverse to the grooves by passing the freshly coated film between the opposing poles of two closely spaced U-shaped magnets, four passes through a field of 10,000 gauss giving 80–85 percent orientation (i.e., alignment of the c-axis, or needle-axis, of the particles perpendicular to the edges of the grooves in the plane of the film as determined by magnetometer techniques). The alkyd binder was then allowed to harden at room temperature over night, thereby locking the magnetic particles in the preferred direction of the magnetization. After hardening, any excess $CrO_2$ and binder were removed from the lands between the grooves by abrading the surface of the film with 0.5 micron $Al_2O_3$ slurried in water to give the desired optical transparency.

Figure 1:
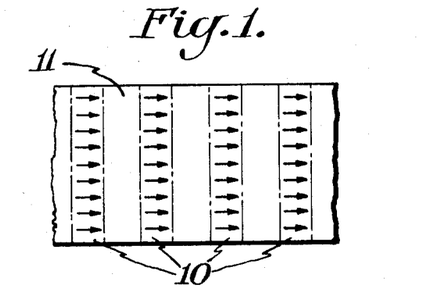
FIG. 1 is a schematic fragmentary plan view of a representative magnetic film which can be employed in the practice of this invention comprising a polymeric support film embossed on the recording surface to retain regularly spaced striations of binder in which are dispersed magnetic particles, the as-received magnetic condition being indicated by equal-length aligned magnetic vectors.

A typical film provided with a line pattern is shown in FIG. 1, wherein the coparallel striations 10 of the light-transparent support film 11 were filled with particulate $CrO_2$ dispersed in binder so as to define individual bands about 0.8 mil wide spaced about 1.2 mil apart, under which conditions the film is approximately 60 percent open (i.e., substantially light-transparent). At this size scale, the bands were virtually invisible to the unaided eye, although they were, in fact, light-opaque, due to their suspended magnetic particle content. Nevertheless, the support film still presented 60 percent light-transparent residual area, which was entirely adequate for the final photographic recording step of this invention. The magnetic state obtained by the common horizontal magnetic orientation coplanar with the support film is denoted schematically by the equal length magnetic vectors drawn transversely of bands 10.

Figure 2:
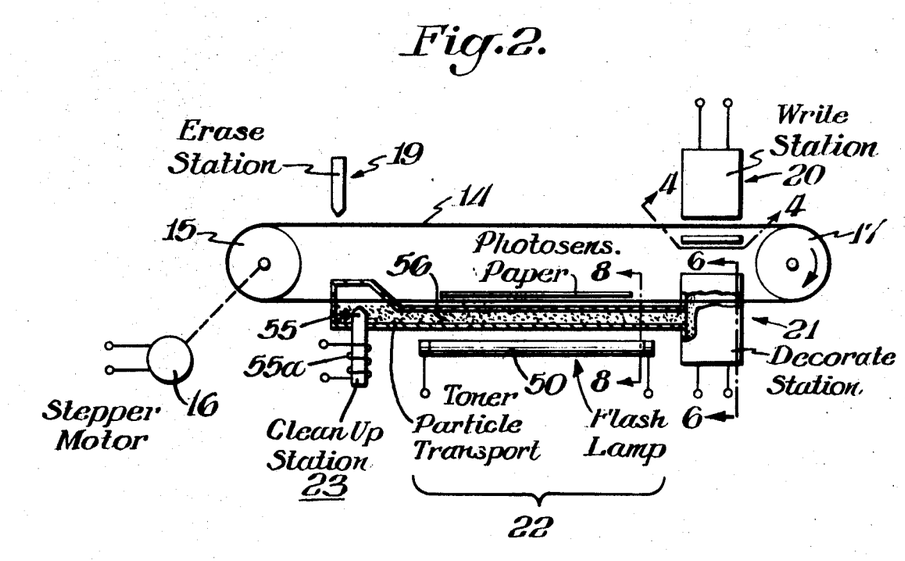
FIG. 2 is a schematic top plan view of a preferred embodiment of apparatus constructed according to this invention, photographic synchronization means being omitted.

The mechanical arrangement of a preferred embodiment of apparatus according to this invention is detailed schematically in plan in FIG. 2, and utilizes an endless flexible belt form magnetic film medium 14 which can have the striated regular line pattern of FIG. 1.

Belt 14 is trained around two sheaves, with its recording surface disposed in a vertical plane outwardly thereof, sheave 15 being driven in successive equal angular steps by stepper motor 16 whereas sheave 17 is an idler. The direction of belt travel is generally clockwise, as seen in FIG. 2, so that belt 14 travels sequentially past (1) an erase station 19, (2) a write state 20, (3) a decorate station 21, (4) a photographic recording station 22 and (5) a cleanup station 23, after which the cycle repeats.

Figures 3, 6:
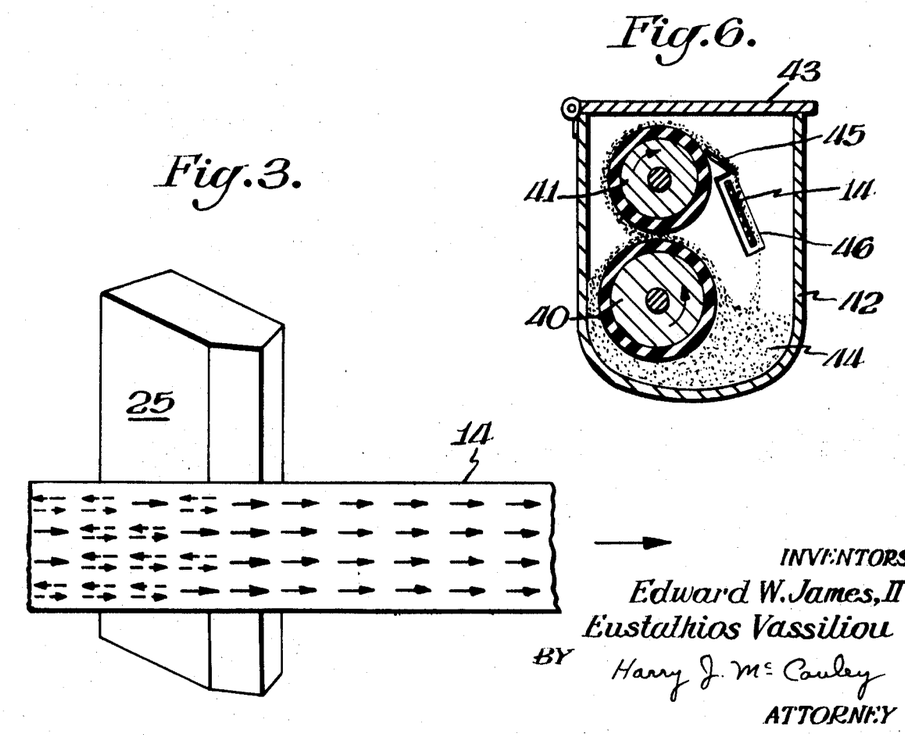
FIG. 3 is a schematic perspective side view of the erase station of FIG. 2.
FIG. 6 is a sectional view taken on line 6—6, FIG. 2, of the toner decorate apparatus.

As shown in FIG. 3, wherein the film line pattern is omitted, the erase station comprises essentially a strong permanent magnet 25 having a flat pole face disposed in close proximity to the recording surface of traveling belt 14. The film arriving at the erase station has its magnetic particle loading in a state of unique characteristic magnetization as a result of preceding magnetic imaging and cleanup operations, and this is denoted by the broken arrow pairs signifying what is effectively the demagnetized state, as hereinafter described in greater detail with respect to write station 20. The polarity of magnet 25 and its magnetizing strength are preselected to restore the magnetic medium to its uniform magnetized condition depicted in FIG. 1.

Upon leaving the erase station, belt 14 advances stepwise as impelled by stepper motor 16, until it is brought before write station 20. Preferably, writing is accomplished by monosymbol units, although the dot matrix or line synthesis methods taught in Gleason PAT. 2,841,461 can be utilized equally well, if desired.

Figure 4:
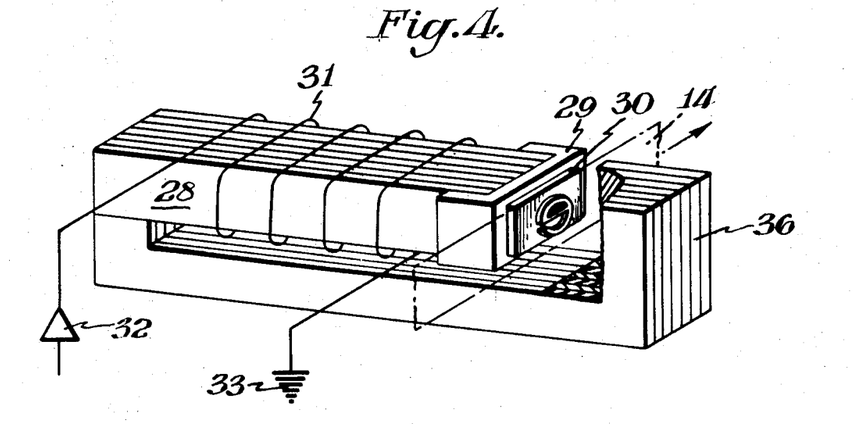
FIG. 4 is a schematic partially broken perspective view of a preferred design of monosymbol magnetic imaging pole piece taken on line 4—4, FIG. 2.

A single monosymbol write element, specifically that for the small letter "e", is detailed in FIG. 4, it being understood that write station 20 comprises a multiplicity of monosymbol write elements (typically 64 in number) arranged side-by-side on 0.1" centers in a line lengthwise of belt 14 along which it is desired to imprint characters.

The design of monosymbol write element detailed in FIG. 4 comprises a core 28 made up of a multiplicity of soft iron laminations, in order to reduce eddy currents, to the end of which is attached the molded ferrite clip 29 carrying the integral individual type font character 30. Thus, each character 30 is a shaped pole piece defining a single alphabetic letter, numeral or other symbol. The type font characters are disposed normal to belt 14, which is indexed to the right as indicated by the arrow in FIG. 4, in close adjacency to the belt recording surface, but out of contact therewith.

The magnetic flux circuit through the belt is completed via a laminated ferromagnetic yoke 36 underlying core 28 having one upstanding face disposed in close proximity to the side of belt 14 opposite character 30 and the other upstanding end in contact with the inboard end of core 28. The magnetic flux gap at the film passage point is 5 mils or less.

Magnetizing coil 31 is wrapped around core 28 with one end connected to a driving amplifier 32, hereinafter described in greater detail, and the other end grounded at 33. Magnetic imaging is effected by an electric pulse transmitted while belt 14 is at rest within write station 20 between successive steps in its advance. The pulse produces a magnetic field emanating from the pole face constituting the upraised character on type font 30, thereby effectively demagnetizing belt 14 in the magnetic particle-loaded area immediately opposite the character. This occurs as a result of momentary magnetization in the "-hard" direction of the $CrO_2$ particles, that is, normal to the c-axis. However, when the field is removed by decay of the pulse, the $CrO_2$ particles immediately revert to their original c-axis magnetization, except that, statistically, one half end up with a polarization to the left and one half to the right. Thus, the projected monosymbol region is effectively demagnetized, a unique condition denoted by the broken arrow pairs reversed in direction as hereinbefore mentioned with reference to FIG. 3. This forms a magnetic image of the letter e of the type font 30 as represented schematically by the alteration of the magnetic vector field of FIG. 1 to that shown in FIG. 5, the region of unique magnetization being bounded by full lines whereas the remainder of the letter, impinging on the transparent intervening open spaces, is shown in broken line representation.

Figure 5:
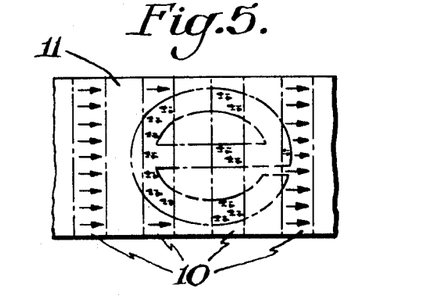
FIG. 5 is a schematic fragmentary plan view of the magnetic film of FIG. 1 indicating the region of magnetization produced by a typical magnetic imaging.

It will be understood that a grossly disproportionate size scale was utilized in drawing FIG. 5 in order to better portray the directional conventions of the magnetization vectors. The magnetic images of the symbols to be recorded are actually much larger in proportion to the widths of striations 10 as well as the spacings therebetween, the small letter e, in typewriter pica style, for example, spanning forty striations 10 together with their intervening spacings.

Belt 14 next passes around idler sheave 17 to decorate station 21 where it is dusted with fine magnetic powder toner (typically a mixture of 10 micron diameter particles containing $Fe + Fe_3O_4$ dispersed in a carnauba wax binder).

A preferred design of decorate station is that detailed in FIG. 6, which utilizes a pair of counter rotating permanent magnet rolls, 40 and 41, carrying on their surfaces a plurality of dipoles (not shown). These rolls are preferably encased in rubber sleeves provided to reduce the magnetic field at the surfaces to a level appreciably below that having any effect on belt 14 while still retaining a strength attracting toner particles to the roll peripheries. Rolls 40 and 41 are journaled within housing 42, provided with hinged cover 43, with shaft centers in vertical alignment, roll 41 being topmost.

A fractional horsepower motor, not shown, which can also simultaneously drive a small screw conveyor returning toner particles from cleanup station 23 to decorate station 21, preferably drives roll 40, a chain-sprocket connection from the latter (not shown) being then used to drive roll 41.

Housing 42 is a reservoir for toner particles 44, which are retained in the lower one third thereof to a depth covering approximately the lower half of roll 40, which attracts the particles to its periphery in the course of rotation, thereby building up a thickness of, typically, 0.1" of transported particles on the rubber sleeve surface. Roll 41, driven at close clearance (typically 0.05") from roll 40, magnetically transfers toner particles to its own periphery and carries them around to about 2 o'clock position where a nonmagnetic doctor blade 45 scrapes them off continuously. The toner drops from the lower end of doctor blade 45 as an even stream falling onto the recording surface of belt 14, advanced at an inclination of about 60° with the horizontal through aligned slots 46 cut in the end walls of housing 42, thereby laying down the optical mask, such as 38, FIG. 7. Excess toner slides off the lower edge of belt 14 and returns to the accumulation 44.

Figure 7:
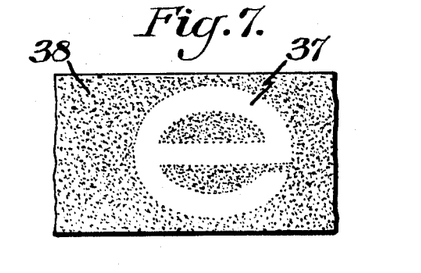
FIG. 7 is a fragmentary plan view of the magnetic film of FIGS. 1 and 5 showing the lay down of an optical mask as a result of toner decoration.

FIG. 7 is intended to represent the magnetic image after optical masking in true scale with respect to the widths of the striations 10 and their intervening transparent spacings, i.e., an expanse of approximately 40 striations spanning the full width of the example letter $e$. Mask 38 is formed by the magnetic fields of the vectors within striations 10 extended areawise by induced magnetization through toner particle ropes or chains which cover the entire area surrounding demagnetized zones with a light-opaque covering of toner particles which, collectively, define the optical mask. It will be understood that the demagnetized $CrO_2$ particles attract only very small amounts of toner, so that the obscuring effect contributed thereby is limited to the internal area of striations 10 where there is no interference with optical masking anyway. Also, in demagnetization, the dipole structure is effectively destroyed, so that ropes or chains of obscuring toner particles are not formed within the regions where not desired. Mask 38 is quite adherent and clings to belt 14 without dislodgement by gravity or start and stop shocks during the succession of steps advancing the belt to the photorecording station 22.

Figure 8:
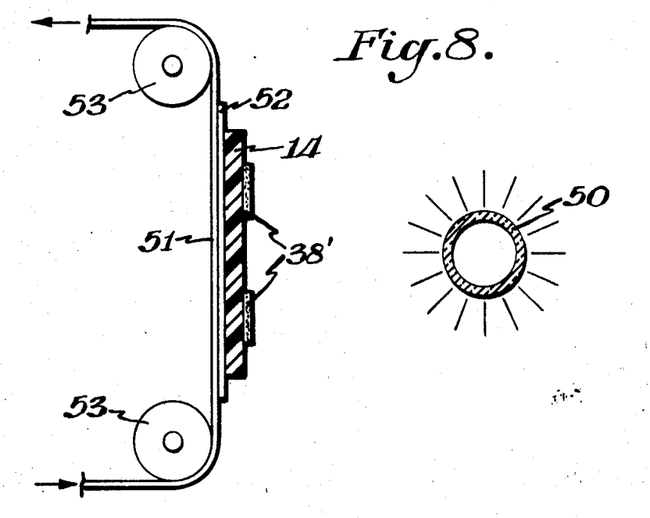
FIG. 8 is a side elevation view of the photographic recording station taken on line 8—8, FIG. 2.

Photorecording station 22, FIG. 8, comprises a linear photographic exposure lamp 50, such as an E. G. & G. Co. xenon type FX–1C–9, provided with an appropriate filter, not shown, disposed adjacent the decorated face of belt 14. Photographic contact printing is employed wherein the belt is isolated from the photographic recording paper 51, which can typically be ultraviolet radiation-sensitive Type 503 Dylux®, by provision of a thin ultraviolet radiation-transparent membrane 52 therebetween barring passage of toner particles constituting part of optical mask 38. (It is sometimes advantageous to substitute a special fiber-optic window for membrane 52 in order to prevent light diffusion reducing the sharpness of optical masking.) Flash lamp 50 is operated intermittently as hereinafter described to record characters imaged on belt 14 in line-by-line sequence, after which photographic recording paper 51 is indexed vertically a distance presenting fresh paper for printing the next-succeeding line by conventional paper advance rolls 53 not detailed further. It should be mentioned that recording on paper 51 is effectuated by light exposure solely, no subsequent development steps being required, so that visual recording of information is complete with the light exposure.

The next station in order is cleanup station 23 at which the toner particles constituting the optical mask on belt 14 are stripped therefrom by an electromagnet 55 disposed in close proximity thereto but out of contact with the surface. The coil 55a of this electromagnet is energized with AC current to produce a field pattern of sufficient intensity to disengage all toner particles from the belt.

The toner particles drop into the hopper of a screw conveyor, or onto a belt or other suitable transport means, indicated generally at 56, and are returned to toner sump 44 at decorate station 21. The clean belt 14 then clears drive sheave 15 and once again arrives at erase station 19 when the entire cycle hereinbefore described is repeated.

The operation of this invention is time-asynchronous, in that input information is processed as received, after which the apparatus remains inactive but in readiness for any elapsed time until a subsequent input is received.

Figure 9:
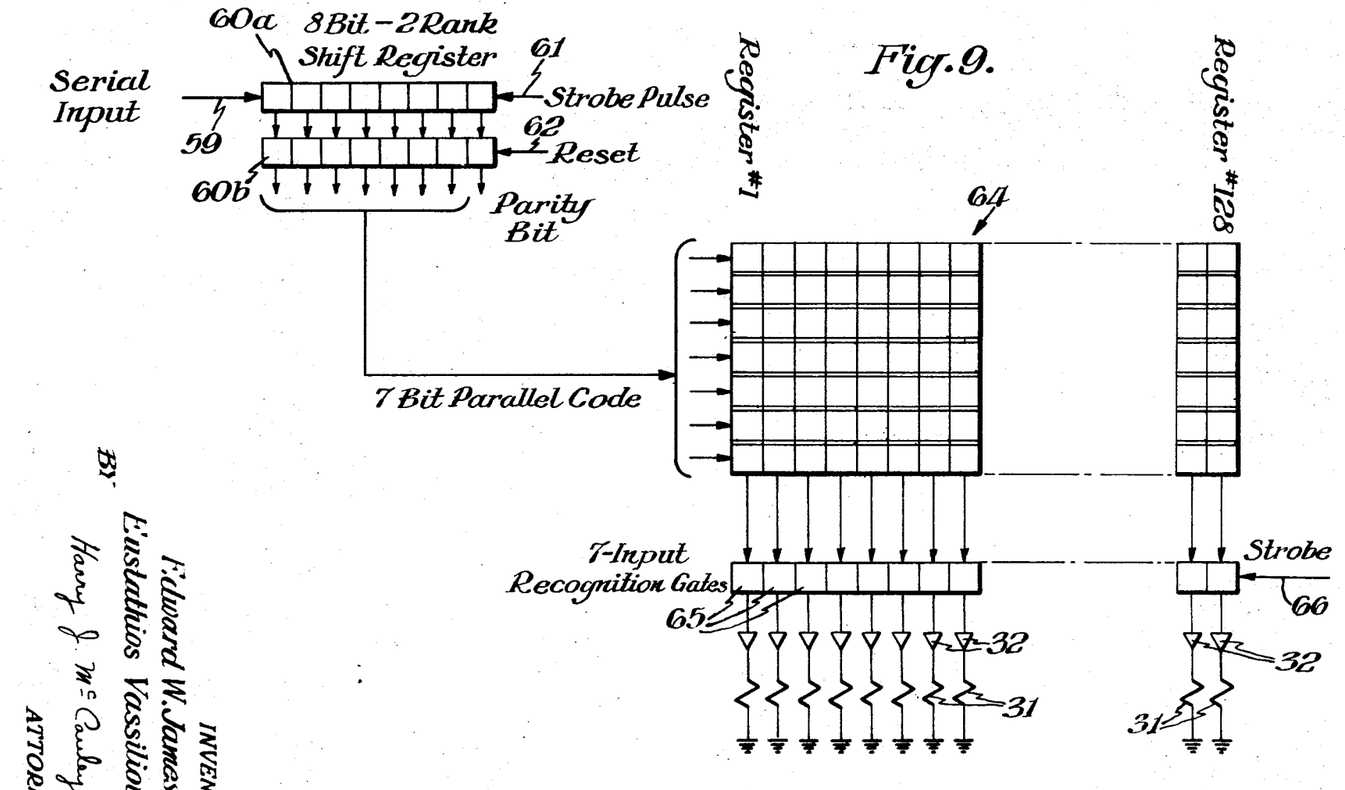
FIG. 9 is a schematic representation of a preferred apparatus for sequence control of the recording operation of the apparatus of FIG. 2.

A preferred apparatus for the sequence control of recording is the shift register combination shown in FIG. 9. Here the information input is introduced in binary code serially as electric pulses via line 59, it being understood that the source can be conventional, e.g. selective switch readout from a perforated tape, the electric pulse transmission of a communication line or in other usual manner. In accordance with conventional practice, the input from line 59 is of two general kinds: (1) informational and, therefore, of a type to be recorded by the apparatus of this invention, and (2) control, e.g. word spacing, carriage return, line spacing and the like which is not to be recorded. It will be understood that stepper motor 16 is provided with control circuitry well known to the art, and therefore not detailed herein, causing it to step upon the receipt of all inputs, both informational and control, wherever required for the recording operation in conventional format.

Assuming, as an example, the use of an 8-bit code which, with 1 bit reserved to parity, leaves 7 bits to accommodate $2^7$ or 128 individual characters, which is sufficient capacity for many uses, the information input can be through the 8-bit, 2 rank shift register, the first rank 60$a$ of which receives the input serially and, thereafter, upon receipt of a strobe pulse through line 61, shifts its contents in parallel to second rank storage 60$b$. Reset of the second rank is effected by a reset pulse supplied through line 62 in proper time relationship with the strobe pulse supplied the first rank. The information is then advanced in parallel, step-by-step as each reset pulse is received via line 62, through the 128 cell 7-bit shift registers shown in partial array at 64, the progress being horizontally from left to right from Register No. 1 to Register No. 128.

Figure 10:
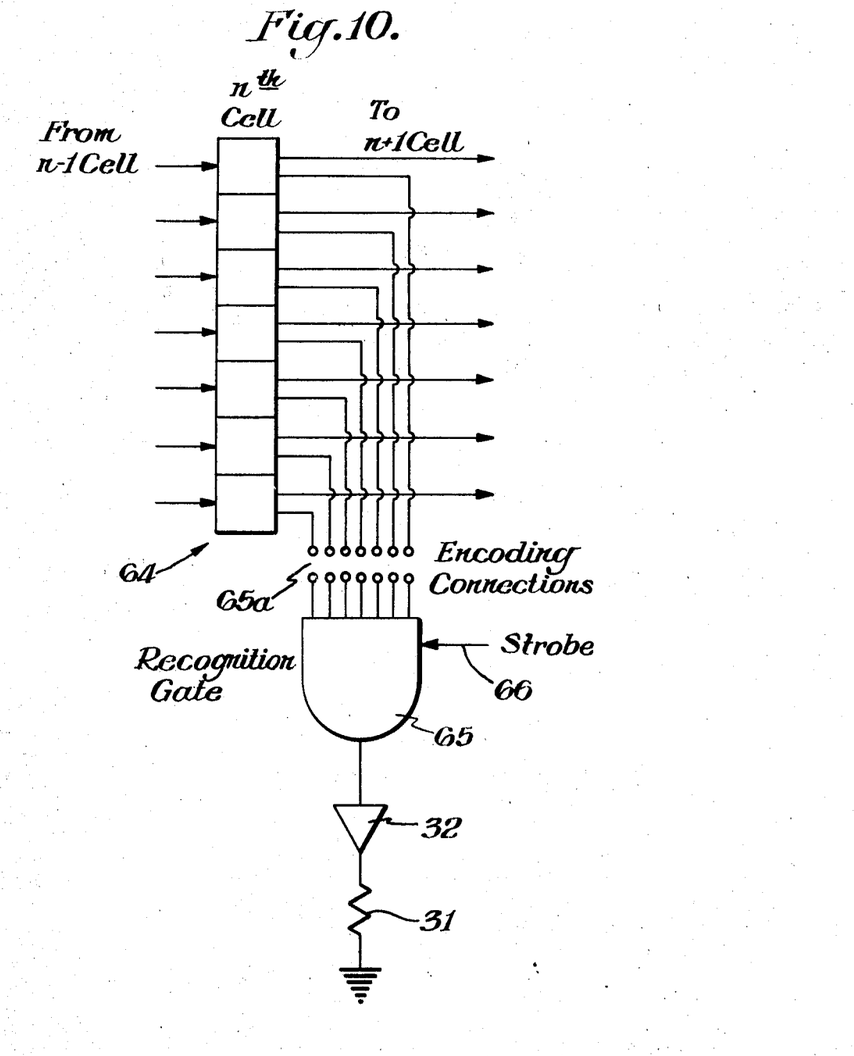
FIG. 10 is a schematic representation of a single recognition AND gate in circuit connection with a single shift register making up the array of FIG. 9.

A plurality of individual symbol recognition AND gates 65 is provided beneath array 64, the general circuit for 7 bit interrogation of each individual shift register $n$ in turn being detailed in FIG. 10. All AND gates 65 conduct their interrogations simultaneously when supplied with a strobe pulse via line 66 and, whenever the code identification assigned to an individual symbol is found to exist across encoding connections 65$a$ (all shown open in FIG. 10 for purposes of generality) gate 65 transmits a voltage pulse through conventional driver amplifier 32 and coil 31 (FIG. 4) to ground, thereby effecting magnetic imaging of the specific desired symbol on the appropriate point on belt 14.

Figure 11:
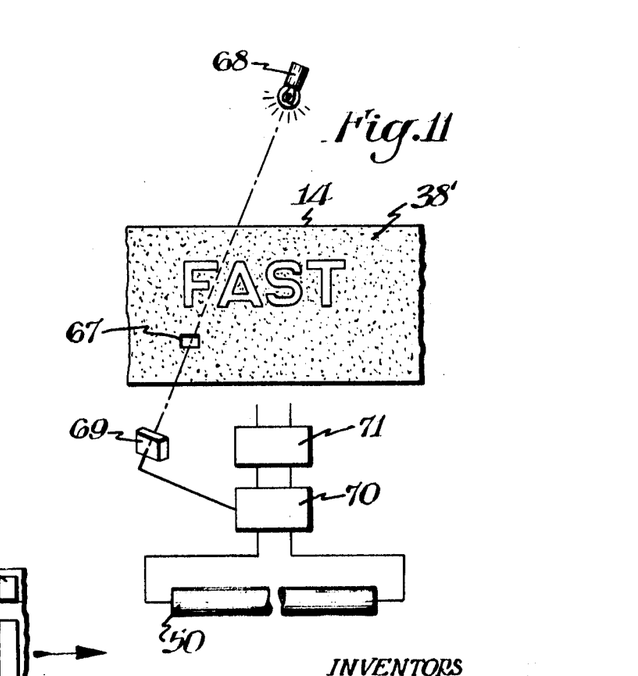
FIG. 11 is a schematic representation of a line margin confirmation apparatus provided for the synchronization of photographic recording with information receipt for the apparatus of FIG. 2.

Line-by-line photographic recording is conveniently effected by the apparatus schematically shown in FIG. 11.

As is customary in information handling, there is provided a characteristic signal in the data input flow signalling the beginning of each line of input receipt.

One monosymbol magnetic imaging apparatus as detailed in FIG. 4 can be reserved for left-hand marginal verification of line arrival at photorecording station 22. Preferably, the recording pole piece for this device is disposed out of the regular line of character recording, FIG. 11 showing the indicia as a magnetically imaged rectangular window 67 located on belt 14 at a point below the line of informational imaging indicated by the word "FAST" defined by the optical mask 38'. As indicated, window 67 has been demagnetized in the identical manner hereinbefore described for symbol imaging generally, and has been masked optically at decorate station 21, so that it defines a light-transmitting area of, typically, 0.1"×0.1".

A continuously illuminated light source 68 on the rear side of belt 14 is trained through a tube, not shown, in line with window 67 at the appropriate left-hand margin point within recording station 22 of FIG. 2 at which photographic recording is to be effected. Then light transmission through window 67 activates photocell 69, which delivers an electric current output to trigger switch 70 which, in turn, connects power supply 71 in operative circuit with flash lamp 50, FIG. 8, thereby transmitting a flash of recording paper exposure radiation through optical mask 38'. It will be understood that window 67 is out of the line of sight of lamp 50 and paper 51, so that there is no photographic printout of the window, which is solely an internal signal facility and not of informational significance.

Figure 12:
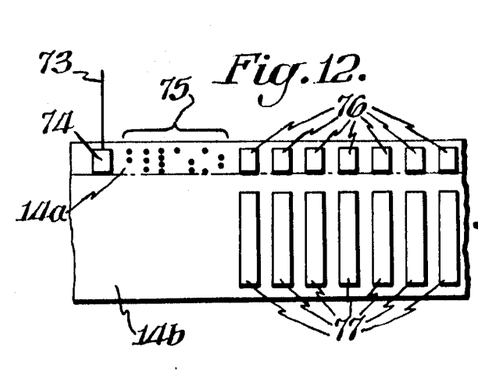
FIG. 12 is a schematic representation of a second embodiment of apparatus for sequence control of the recording operation of the apparatus of FIG. 2.

A second embodiment of time sequence control is represented schematically in FIG. 12 wherein belt 14 is effectively divided lengthwise into two parallel tracks, the upper track, $14_a$, of which is reserved exclusively for location coding, whereas the lower track, $14_b$, is reserved exclusively for information printin.

Here a magnetic write head 74 is provided in confrontation with the recording face of the magnetic belt to image magnetically in code 75 the as-received sequence of symbols to be printed responsive to the information input fed to the write head via line 73.

A sensor 76 is provided downline for each individual symbol to be printed and a magnetic writing head 77, which can be of the same design as that shown in FIG. 4, corresponding to the same symbol as that for which an individual sensor 76 is reserved, is disposed in exact transverse alignment therewith across the belt but in confrontation with the information printin track $14_b$.

Sensors 76 can incorporate discriminatory AND gates such as those hereinbefore described with reference to FIG. 10, enabling recognition of the coded counterpart of each symbol in turn as the belt advances from left to right, whereupon each sensor 76 actuates its associated writing head 77 via circuit connections not detailed when the belt arrives thereunder. The writing heads 77 then effect the magnetic imaging of the information on the belt in the same manner as hereinbefore described.

With this embodiment it is understood that a common erase magnet 25 is employed to simultaneously restore the magnetic condition of both tracks $14_a$ and $14_b$ to original state permitting reuse of the belt for repetitive recording.

It will be understood that recording according to this invention, even with stepped belt operation, can be effected at relatively high speeds, it being practicable to pring approximately 4 lines/sec. wherein each line consists of 70–80 characters.

If information input is at a constant fast rate, magnetic imaging can be done on the fly, thereby dispensing with stepped operation. However, conventional light sources 50 emit their light over a perceptible time period, which tends to "smear" the photographic recording unless belt 14 is halted at least long enough to effect line-by-line recording as described. If a high speed light source is employed, the entire operation can be on a continuous basis, without belt stopping except as dictated by the information input.

While flexible tape magnetic films of the design represented by belt 14 are especially preferred in the practice of this invention because of ease of manipulation, low first cost and very long service light in terms of multicyclic utilization, rigid plates of polymer, glass or a wide variety of other materials are completely operative substitutes and may, in particular circumstances, be actually preferred. Also, magnetic film media in roll form, as distinguished from endless belts, can be employed if desired. Roll type magnetic film has the advantage that permanent storage of magnetically imaged information is thereby afforded, with visual printout practicable at any optional subsequent time. The magnetic particles utilized can have a wide variety of compositions as well as particulate orientations and dispositions, $CrO_2$ in the orientations and striation and random loading patterns described being only by way of examples. The photographic recording can be accomplished by a wide variety of techniques, including the use of conventional photographic film.

Characteristic demagnetization as described has proved effective in magnetic imaging; however, it is also practicable if desired, to utilize several cycles of damped AC voltage applied through coils 31.

Moreover, although black-on-white recording has been hereinbefore described as preferred, white-on-black is equally conveniently obtainable by merely reversing the characteristic magnetizations.

What is claimed is:

1. Apparatus for magnetic-optical printing comprising, in combination in the following sequential operating order:
   a. magnetic recording means forming a magnetic image of subject matter to be recorded upon a light-transparent magnetic medium comprising a light-transparent support carrying distributed particulate magnetic material affixed to the surface of said support reserved as the magnetic recording surface in a density preserving substantial optical transparency throughout said support,
   b. decorate means dispensing magnetic toner on said recording surface of said magnetic medium defining an adherent optical mask of said image,
   c. a photographic recording medium-exposure light source subassembly provided with means for the interposition between said photographic recording medium and said exposure light source of said magnetic medium carrying said adherent optical mask of said image, and
   d. means actuating said exposure light source to emit exposure radiation through said optical mask onto said photographic recording medium.

2. Apparatus for magnetic-optical printing according to claim 1 wherein said photographic recording medium-exposure light source subassembly is of a type such that the exposure radiation is primarily in the ultraviolet range.

3. Apparatus for magnetic-optical printing according to claim 1 responsive to sequential subject matter input provided with means effecting step-by-step sequential operation coordinated in sequence with receipt of said subject matter input.

4. Apparatus for magnetic-optical printing according to claim 1 wherein said subject matter to be recorded is received as a sequential electrical pulse digital code information input to be printed upon said magnetic medium advanced linearly to accommodate said information input spacewise provided, in series connection, with (1) a multirank shift register receiving said input in series sequence and (2) an array of multibit shift registers advancing said input in parallel, said multibit shift registers (2) being provided with individual symbol recognition gates effecting selective formation of said magnetic image of said subject matter to be recorded in sequence corresponding to said information input.

5. Apparatus for magnetic-optical printing according to claim 1 wherein said subject matter to be recorded is received as a sequential electrical pulse digital code information input to be printed upon said magnetic medium advanced linearly to accommodate said information input spacewise provided, in series arrangement, with (1) magnetic write-in means recording said pulse code information input along a first track of said magnetic medium reserved for information input receipt, (2) individual symbol recognition sensors disposed along said first track detecting the spaced arrival of individual items of said information input and (3) individual magnetic write-in means responsive to said individual symbol recognition sensors effecting selective formation of said magnetic image of said subject matter to be recorded in sequence corresponding to said information input along a second track of said magnetic medium reserved for said optical printing.

6. Apparatus for magnetic-optical printing according to claim 3 provided in sequence after said photographic recording medium-exposure light source subassembly with electromagnetic means stripping said magnetic toner from said light-transparent magnetic medium.

7. Apparatus for magnetic-optical printing according to claim 6 provided in sequence after said electromagnetic means stripping said magnetic toner from said light-transparent magnetic medium with magnetic erase means restoring said light-transparent magnetic medium to uniform magnetized condition suitable for subsequent magnetic reimaging utilization.

8. Apparatus for magnetic-optical printing according to claim 7 wherein said light-transparent magnetic medium comprises an endless flexible belt.

9. Method for magnetic-optical printing utilizing a photographic recording medium which is exposed to an associated light source, comprising, in sequence:
   a. forming a magnetic pattern imaging the subject matter to be printed upon a light-transparent uniformly magnetized magnetic medium comprising a light-transparent support carrying distributed particulate magnetic material affixed to the surface of said support reserved as the magnetic recording surface by characteristic magnetization of said particulate magnetic material constituting the image of said subject matter to be printed to a condition of different receptivity for ferromagnetic toner as contrasted with the adjacent background of said magnetic medium,
   b. decorating said recording surface of said magnetic medium with a ferromagnetic toner defining an adherent optical mask of said image,
   c. interposing said magnetic medium carrying said adherent optical mask of said image between said photographic recording medium and said associated light source, and
   d. actuating said light source to emit exposure radiation through said optical mask onto said photographic recording medium.

10. A method for magnetic-optical printing according to claim 9 wherein the step (d) of said printing is effected using ultraviolet radiation.